US007872695B2

(12) United States Patent
Kondou

(10) Patent No.: US 7,872,695 B2
(45) Date of Patent: Jan. 18, 2011

(54) PROCESS OF PRODUCING OPTICAL COMPENSATION SHEET, POLARIZING PLATE COMPRISING AN OPTICAL COMPENSATION SHEET PRODUCED BY SAID PROCESS, AND LIQUID CRYSTAL DISPLAY DEVICE

(75) Inventor: Shunichi Kondou, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 216 days.

(21) Appl. No.: 12/280,452

(22) PCT Filed: Mar. 20, 2007

(86) PCT No.: PCT/JP2007/056514

§ 371 (c)(1), (2), (4) Date: Aug. 22, 2008

(87) PCT Pub. No.: WO2007/108555

PCT Pub. Date: Sep. 27, 2007

(65) Prior Publication Data

US 2009/0066883 A1  Mar. 12, 2009

(30) Foreign Application Priority Data

Mar. 22, 2006  (JP)  .............................. 2006-078941

(51) Int. Cl.
G02F 1/133 (2006.01)
(52) U.S. Cl. .......................................... 349/17; 349/18
(58) Field of Classification Search ................... 349/17, 349/18

See application file for complete search history.

(56) References Cited

U.S. PATENT DOCUMENTS

| | | | |
|---|---|---|---|
| 5,583,679 A | 12/1996 | Ito et al. | |
| 5,646,703 A | 7/1997 | Kamada et al. | |
| 5,699,136 A | 12/1997 | Arakawa et al. | |
| 5,805,253 A | 9/1998 | Mori et al. | |
| 5,855,971 A | 1/1999 | Kobori et al. | |
| 6,081,312 A | 6/2000 | Aminaka et al. | |
| 6,184,957 B1 | 2/2001 | Mori et al. | |
| 6,678,026 B2* | 1/2004 | Maeda et al. | 349/113 |
| 7,460,103 B2* | 12/2008 | Konno et al. | 345/102 |
| 2003/0103177 A1* | 6/2003 | Maeda et al. | 349/113 |
| 2004/0046900 A1* | 3/2004 | Boer et al. | 349/43 |
| 2004/0113877 A1* | 6/2004 | Abileah et al. | 345/92 |
| 2005/0134751 A1* | 6/2005 | Abileah et al. | 349/42 |
| 2005/0184952 A1* | 8/2005 | Konno et al. | 345/102 |
| 2005/0285985 A1* | 12/2005 | Boer et al. | 349/42 |
| 2006/0127605 A1 | 6/2006 | Takeda et al. | |
| 2006/0240196 A1 | 10/2006 | Shutou et al. | |
| 2007/0211013 A1* | 9/2007 | Uehara et al. | 345/102 |
| 2008/0062156 A1* | 3/2008 | Abileah et al. | 345/204 |

FOREIGN PATENT DOCUMENTS

| | | |
|---|---|---|
| DE | 39 11 620 A1 | 10/1990 |
| JP | 06-214116 A | 8/1994 |
| JP | 09-026572 A | 1/1997 |
| JP | 09-039416 A | 2/1997 |
| JP | 10-054982 A | 2/1998 |
| JP | 2866372 B2 | 3/1999 |
| JP | 2004-233988 A | 8/2004 |
| JP | 2004-258613 A | 9/2004 |
| JP | 2005-274909 A | 10/2005 |
| WO | WO 96/37804 A1 | 11/1996 |
| WO | WO 00/68740 A1 | 11/2000 |

OTHER PUBLICATIONS

Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2007/056514, Oct. 2, 2008, The International Bureau of WIPO, Geneva, CH.
PCT/ISA/210, International Search Report, Aug. 22, 2008.
PCT/ISA/237, Written Opinion of the ISA, Aug. 22, 2008.

* cited by examiner

Primary Examiner—K. Cyrus Kianni
(74) Attorney, Agent, or Firm—Buchanan Ingersoll & Rooney PC

(57) ABSTRACT

A process of producing an optical compensation sheet is provided, which comprises applying a solution comprising a liquid crystalline compound and a photo-polymerization initiator on a transparent support, drying the solution at a drying temperature which satisfies the following formula (1) to align the liquid crystalline compound, and then fixing the liquid crystalline compound by light irradiation to form an optical anisotropic layer:

$$T \leq 0.0014 \times Ecoh - 65 \qquad (1)$$

wherein T represents drying temperature (° C.), Ecoh represents condensation energy (J/mol) of the photo-polymerization initiator, by which an optical compensation sheet of stable optical characteristics can be obtained by using an essentially needed amount of photo-polymerization initiator for the photo-polymerization reaction. By the process of the present invention, the staining of the production facility of the optical compensation sheet derived from vaporization of photo-polymerization initiator can be reduced.

5 Claims, No Drawings

PROCESS OF PRODUCING OPTICAL COMPENSATION SHEET, POLARIZING PLATE COMPRISING AN OPTICAL COMPENSATION SHEET PRODUCED BY SAID PROCESS, AND LIQUID CRYSTAL DISPLAY DEVICE

TECHNICAL FIELD

The present invention relates to a process of producing an optical compensation sheet having an optically anisotropic layer comprising a liquid crystalline compound fixed by using a photo-polymerization initiator, a polarizing plate comprising an optical compensation sheet produced by said process, and a liquid crystal display device.

BACKGROUND ART

Liquid crystal display device comprises a liquid crystal cell, polarizing elements, and an optical compensation sheet (a retardation plate). In a transmissive liquid crystal display device, polarizing element is attached to each of two sides of a liquid crystal cell, and between the liquid crystal cell and either one of the polarizing elements, at least one optical compensation sheet is arranged.

A reflective liquid crystal display device is configured generally by arranging a reflector plate, a liquid crystal cell, at least one optical compensation sheet, and a polarizing element in this order. The liquid crystal cell comprises liquid-crystalline molecules, two substrates encapsulating the liquid-crystalline molecules, and electrode layers applying voltage to the liquid-crystalline molecules. For liquid crystal cell, various display modes are proposed depending on variation in orientation state of the liquid-crystalline molecules: TN (twisted nematic), IPS (in-plane switching), FLC (ferro-electric liquid crystal), OCB (optically compensatory bend), STN (supper twisted nematic) and VA (vertically aligned) for a transmissive liquid crystal display device, and HAN (hybrid aligned nematic) for a reflective liquid crystal display device.

The optical compensation sheet has been employed in various liquid crystal display devices in order to cancel coloring of images, and to expand the viewing angle. As an optical compensation sheet, a stretched polymer film was conventionally used. However in recent years, there has been proposed a use of an optical compensation sheet comprising an optically anisotropic layer formed by applying a liquid crystalline composition comprising a liquid crystalline compound to a transparent support, in place of the stretched polymer film. As various orientation states can be obtained with liquid crystalline compounds, optical characteristics which have never been obtained by the conventional stretched polymer film can be achieved by using a liquid crystalline compound. Optical compensation sheets for various display modes of a liquid crystal cell using liquid crystalline compounds have been already proposed. For example, Japanese Laid-Open Patent Publication "Tokkaihei" No. 6-214116, U.S. Pat. Nos. 5,583,679 and 5,646,703, and German Patent Application Publication No. 3911620 disclose an optical compensation sheet for a TN mode liquid crystal cell. Japanese Laid-Open Patent Publication "Tokkaihei" No. 10-54982 discloses an optical compensation sheet for IPS and FLC mode liquid crystal cells. U.S. Pat. No. 5,805,253 and WO 96/37804 discloses an optical compensation sheet for OCB and HAN mode liquid crystal cells; Japanese Laid-Open Patent Publication "Tokkaihei" No. 9-26572 discloses an optical compensation sheet for STN mode liquid crystal cell; and Japanese Patent No. 2866372 discloses an optical compensation sheet for VA mode liquid crystal cell.

SUMMARY OF THE INVENTION

An optical compensation sheet comprising an optically anisotropic layer formed of a liquid crystalline composition, generally can be produced by providing an alignment layer and an optically anisotropic layer comprising a liquid crystalline compound on a transparent support. As the process of producing the optical compensation sheet, a process is generally known which involves applying a solution comprising at least liquid crystalline compound and a photo-polymerization initiator on an alignment layer, drying the solution to align the liquid crystalline compound, and then polymerizing the liquid crystalline compound to harden the optically anisotropic layer by UV (ultraviolet) light.

The drying of the solution is frequently conducted at a relatively high temperature because the drying should achieve not only a film formation by evaporating the solvent but aligning the liquid crystalline compound. Therefore, a problem arose that a photo-polymerization initiator vaporizes during the drying. Vaporization of the photo-polymerization initiator lowers the content of the photo-polymerization initiator in the film. Therefore, fixing of the liquid crystalline compound while maintaining the orientation state becomes insufficient, leading to degradation of performance as an optically anisotropic layer. As a method to solve the problem, it can be considered that the photo-polymerization initiator is used at an excessive amount. However, it causes a problem regarding costs, a problem that coating and drying facility get stained severely. Therefore, improvement in this regard has been desired.

The first object of the present invention is thus to provide a process of producing an optical compensation sheet at an essentially needed amount of photo-polymerization initiator for photo-polymerization reaction. The second object of the present invention is thus to improve a process yield of production by lowering the staining of the production facility of the optical compensation sheet derived from vaporization of photo-polymerization initiator.

The inventors of the present invention examined relation between vaporized amount of photo-polymerization initiator and drying temperature. As a result, they found that condensation energy of the photo-polymerization initiator and drying temperature for vaporization has correlation. The present invention was achieved based on these findings.

The present invention thus provides the following [1] to [6].

[1] A process of producing an optical compensation sheet, which comprises applying a solution comprising a liquid crystalline compound and a photo-polymerization initiator on a transparent support, drying the solution at a drying temperature which satisfies the following formula (1) to align the liquid crystalline compound, and then fixing the liquid crystalline compound by light irradiation to form an optical anisotropic layer:

$$T \leq 0.0014 \times Ecoh - 65 \qquad (1)$$

wherein T represents drying temperature (° C.), Ecoh represents condensation energy (J/mol) of the photo-polymerization initiator.

[2] The process according to the above 1, wherein the optical compensation sheet further comprises an alignment layer between the transparent support and the optical anisotropic layer.

[3] The process according to the above 2, wherein the alignment layer comprises an organic compound having a polymerizable group.

[4] The process according to any one of the above 1 to 3, wherein the transparent support is a cellulose acylate film.

[5] A polarizing plate which comprises the optical compensation sheet obtainable from the process according to any one of the above 1 to 4.

[6] A liquid crystal display device which comprises the polarizing plate according to the above 5.

DETAILED DESCRIPTION OF THE INVENTION

The present invention will be explained below.

In the specification, ranges indicated with "to" mean ranges including the numerical values before and after "to" as the minimum and maximum values.

In the specification, Re ($\lambda$) and Rth ($\lambda$) represent an in-plane retardation and a retardation in the thickness direction at a wavelength $\lambda$, respectively. The Re ($\lambda$) is measured by means of KOBRA 21ADH or WR manufactured by Oji Scientific Instruments while applying a $\lambda$ nm wavelength light in the normal line direction of the film. The Rth($\lambda$) is calculated in the following manner when a film of a uniaxial or biaxial refractive index ellipsoid is measured.

The Rth($\lambda$) is calculated by KOBRA 21ADH or WR based on 6 retardation values, an assumed value of average refractive index, and an inputted thickness. As the 6 retardation values, Re ($\lambda$) values are measured by applying a $\lambda$ nm wavelength light to a film from 6 directions tilted at 0 to 50 degrees with 10 degrees interval to the film normal line by using an in-plane slow axis (detected by KOBRA 21ADH or WR) as a tilt axis (a rotation axis) or, when the film has no slow axis, by using an arbitrary in-plane axis as a rotation axis.

In the above calculation, when the film has a retardation value of 0 at a certain tilt angle to the normal line using the in-plane slow axis as the rotation axis, positive sign of a retardation value at a tilt angle larger than the certain tilt angle is converted to negative sign, and then the negative retardation value is used in the calculation by KOBRA 21ADH or WR.

The Rth may be calculated by the following equalities (11) and (12) based on an assumed value of average refractive index, an inputted thickness, and 2 retardation values that is measured in 2 tilt directions by using a slow axis as a tilt axis (a rotation axis), or when the film has no slow axis, by using an arbitrary in-plane axis as a rotation axis.

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equality (11)

Re·($\theta$) represents a retardation value in a direction tilted at an angle $\theta$ to the normal line. In the equality (11), nx represents an in-plane refractive index in the slow axis direction, ny represents an in-plane refractive index in a direction perpendicular to the slow axis direction, and nz represents a refractive index in a direction perpendicular to the above directions.

$$Rth = ((nx+ny)/2 - nz) \times d$$

Equality (12)

When a film is measured that is not a uniaxial or biaxial index ellipsoid and thus has no so-called optic axis, Rth($\lambda$) is calculated in the following manner. The Rth ($\lambda$) is calculated by KOBRA 21ADH or WR based on 11 retardation values, an assumed value of average refractive index, and an inputted thickness. As the 11 retardation values, Re($\lambda$) values are measured by applying a $\lambda$nm wavelength light to the film from 11 directions tilted at −50 to +50 degrees with 10 degrees interval to the film normal line by using an in-plane slow axis (detected by KOBRA 21ADH or WR) as a tilt axis (a rotation axis).

In the above measurement, the assumed values of average refractive indexes may be those described in *Polymer Handbook* (JOHN WILEY & SONS, INC.) and catalogs of various optical films. As for a film of which an average refractive index is unknown, the value can be measured by an Abbe refractometer. The average refractive indexes of major optical film materials are as follows: cellulose acylate (1.48), cycloolefin polymer (1.52), polycarbonate (1.59), polymethyl methacrylate (1.49), polystyrene (1.59). By inputting the assumed average refractive index values and thicknesses, nx, ny, and nz are calculated by KOBRA 21ADH or WR.

The optical compensation sheet produced by the process of the present invention is configured by providing an optically anisotropic layer formed of a composition comprising a liquid crystalline compound on a transparent support. An alignment layer is preferred to be further provided between the transparent support and the optically anisotropic layer. When two or more optically anisotropic layers are provided, an alignment layer may be provided on the optically anisotropic layer. In addition, a primer layer may be provided between the transparent support and the alignment layer in order to improve the adhesion, or a protective layer may be provided on the optically anisotropic layer in order to protect the surface. The composition for forming an optically anisotropic layer mainly comprises a liquid crystalline compound which expresses optical anisotropy, a polymer binder, and a photopolymerization initiator. The composition may be further added with additives such as a monomer, a surfactant, an orientation temperature lowering agent, a chiral agent, and the like, if necessary. The thickness of the optically anisotropic layer is preferably 0.5 to 100 μm, and more preferably 0.5 to 30 μm.

[Liquid Crystalline Compound]

As the liquid crystalline compound, a rod-like liquid crystalline compound or discotic a liquid crystalline compound is preferred.

As the rod-like liquid crystalline compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkcenylcyclohexyl benzonitriles are preferably used. Fixing of these rod-like liquid crystalline compounds can be conducted by introducing a polymerizable group (example of the polymerizable group are the same as those of the discotic liquid crystalline compounds shown below) into terminal structure of the rod-like liquid crystalline compound and by conducting polymerization/hardening reaction. High-molecular weight liquid crystalline compounds as well as the above-listed low-molecular weight liquid crystalline compounds may also be used. The high-molecular weight liquid crystalline compounds may be polymers which have residues corresponding to the above-listed low-molecular weight liquid crystalline compounds. Japanese Laid-Open Patent Publication "Tokkaihei" No. 5-53016 describes an optical compensation sheet wherein a high-molecular weight liquid crystalline compound is used.

Examples of the discotic liquid crystalline compound are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)). The polymerization of discotic liquid crystalline compounds is described in Japanese Laid-Open Patent Publication No. hei 8-27284.

Polymerizable group as a substituent may be necessarily bonded to the disk-shaped core of a discotic liquid-crystalline molecule to fix the discotic liquid-crystalline molecules by polymerization. However, when a polymerizable group is directly bonded to the disk-shaped core, the alignment state is hard to be maintained during polymerization reaction. Accordingly, a linking group is preferably introduced between the disk-shaped core and the polymerizable group. That is, the discotic liquid crystalline compound is preferably a compound represented by the following Formula (I).

$$D(-L-P)_n \qquad \text{Formula (I)}$$

In the formula (I), "D" represents a discotic core, L represents a divalent linking group, P represents a polymerizable group and n is an integer from 4 to 12.

Examples of the core, "D", are shown below. In the examples, LP (or PL) means a combination of a divalent linking group (L) and a polymerizable group (P).

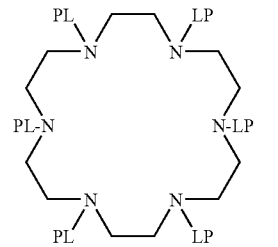
(D1)

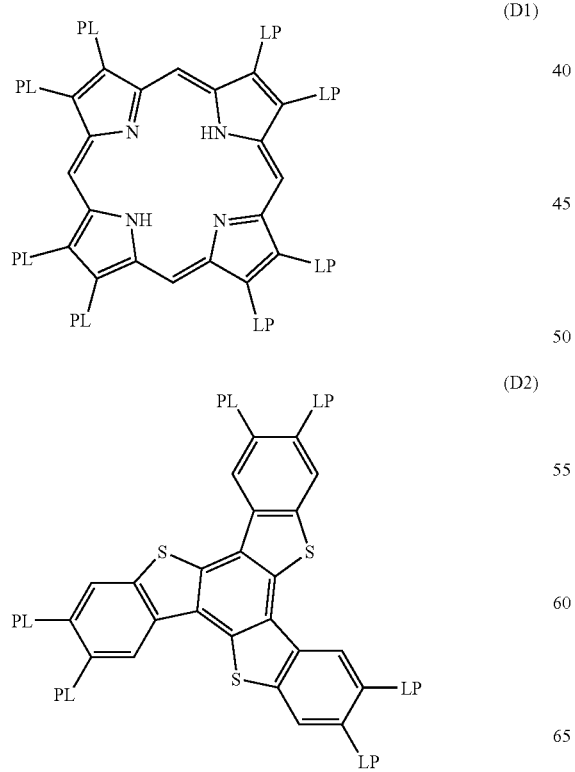
(D2)

-continued

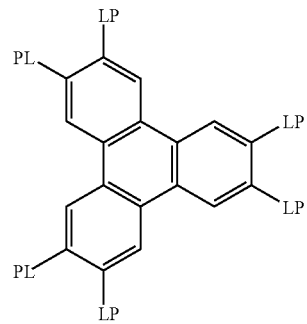
(D3)

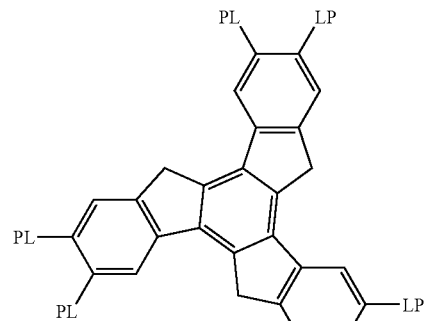
(D4)

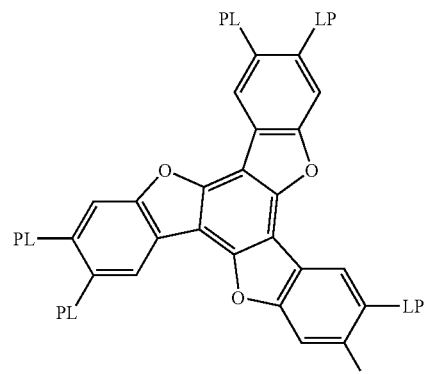
(D5)

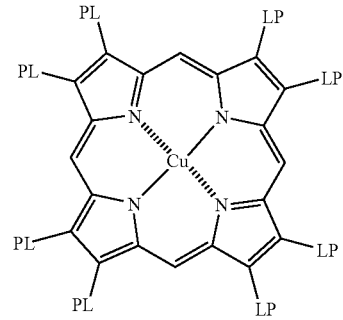
(D6)

(D7)

-continued
(D8)
(D9)
(D10)
(D11)
(D12)
(D13)
(D14)
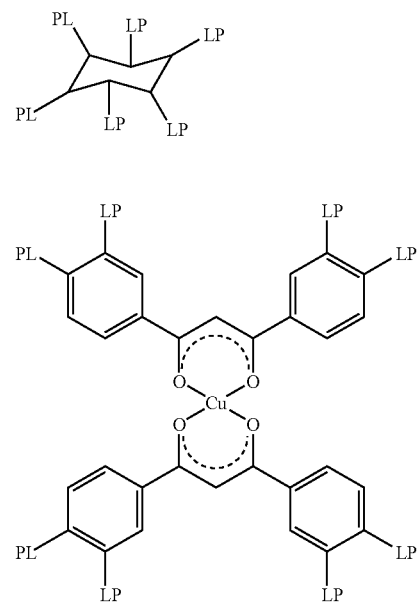
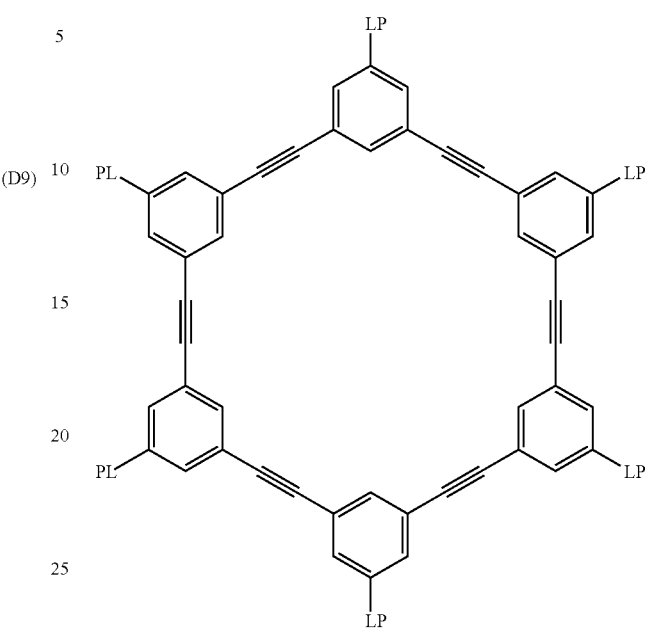
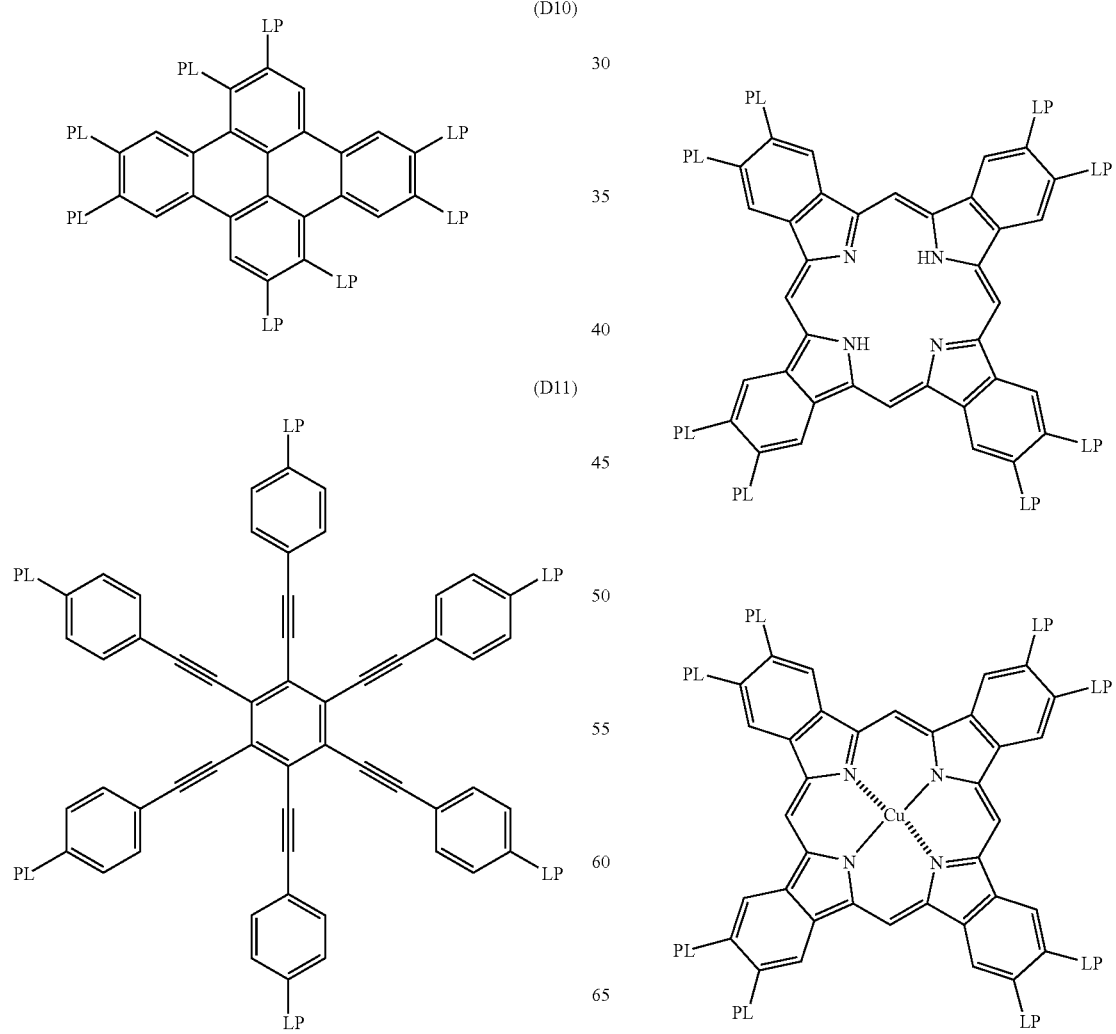

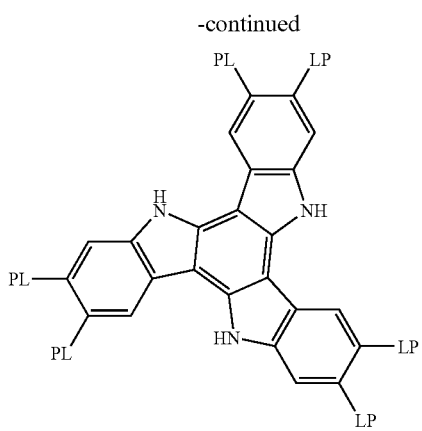

(D15)

In the above Formula (I), divalent linking group (L) is preferably selected from the group consisting of an alkylene group, alkenylene group, arylene group, —CO—, —NH—, —O—, —S— and any combinations thereof. The divalent linking group (L) is preferably a group combining at least two divalent groups selected from the group consisting of an alkylene group, an arylene group, —CO—, —NH—, —O—, and —S—. Most preferably, the divalent linking group (L) is a group combining at least two divalent groups selected from the group consisting of an alkylene group, an arylene group, —CO— and —O—. The alkylene group preferably comprises from 1 to 12 carbon atoms. The alkenylene group preferably comprises form 2 to 12 carbon atoms. The arylene group preferably comprises from 6 to 10 carbon atoms.

Examples of the divalent linking group (L) are shown below. Each of them is bonded on the left to disk-shaped core (D) and on the right to polymerizable group (P). "AL" denotes an alkylene group or alkenylene group, and "AR" denotes an arylene group. The alkylene group, alkenylene group or arylene group may have a substituent such as an alkyl group.

L1: -AL-CO—O-AL-

L2: -AL-CO—O-AL-O—

L3: -AL-CO—O-AL—O-AL-

L4: -AL-CO—O-AL-O—CO—

L5: —CO-AR-O-AL-

L6: —CO-AR-O-AL-O—

L7: —CO-AR—O-AL—O—CO—

L8: —CO—NH-AL—

L9: —NH-AL—O—

L10: —NH-AL—O—CO—

L11: —O-AL—

L12: —O-AL—O—

L13: —O-AL—C—CO—

L14: —O-AL—C—CO—NH-AL—

L15: —O-AL—S-AL—

L16: —O—CO-AR—C-AL—CO—

L17: —O—CO-AR—C-AL—C—CO—

L18: —O—CO-AR—O-AL—O-AL—O—CO—

L19: —O—CO-AR—O-AL—O-AL—O-AL—O—CO—

L20: —S-AL—

L21: —S-AL—C—

L22: —S-AL—C—CO—

L23: —S-AL—S-AL—

L24: —S-AR-AL—

In the Formula (I), the polymerizable group (P) may be selected depending on the type of polymerization reaction. Examples of the polymerizable group are shown below.

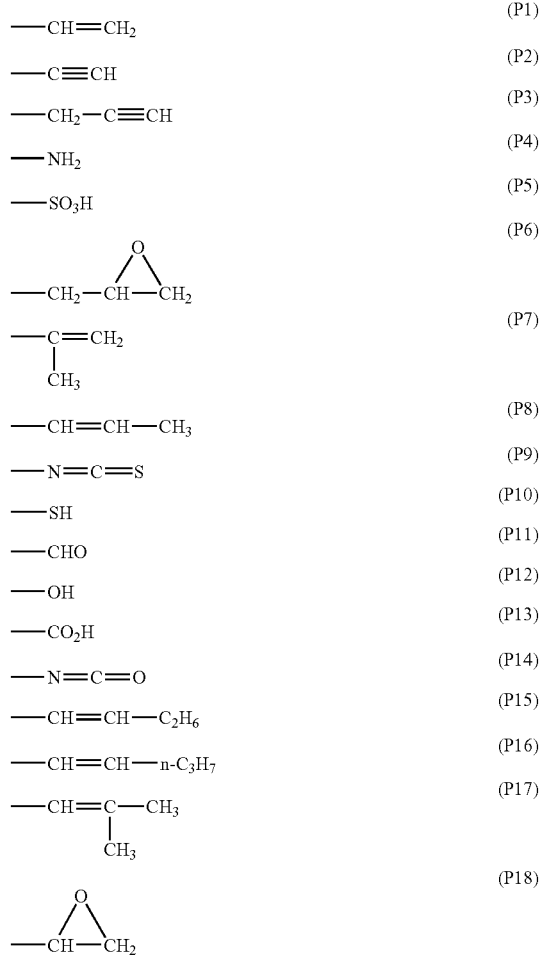

As the polymerizable group (P), unsaturated polymerizable groups (P1, P2, P3, P7, P8, P15, P16, P17) or epoxy groups (P6, P18) are preferred, unsaturated polymerizable groups are more preferred, and ethylene-type unsaturated polymerizable groups (P1, P7, P8, P15, P16, P17) are most preferred.

In the Formula (I), n is an integer from 4 to 12. The value is determined depending on the species of the discotic core (D). The plural combinations of L and P may be different or identical each other, however, are preferably identical to each other. Liquid crystalline compounds are used in a range of 50 to 99.9% by weight, preferably 70 to 99.9% by weight, more preferably 80 to 99.5% by weight with respect to the total weight of the optically anisotropic layer.

[Binder Polymer]

Binder polymer is used for the purpose of controlling the temperature of liquid crystal phase transition and optical characteristics, and improving coating property. Specific examples of the polymer compound include polymethylmethacrylate, acrylic acid/methacrylic acid copolymer, styrene/maleimide copolymer, polyvinyl alcohol, poly(N-methyrol acrylamide), styrene/vinyl toluene copolymer, chlorosulfonated polystyrene, nitro cellulose, cellulose esters, polyvinyl chloride, chlorinated polyethylene, polyester, polyimide, vinyl acetate/vinyl chloride copolymer, ethylene/vinyl acetate copolymer, polyethylene, polypropylene, polycarbonate, a silicone-type polymer, and a fluorine-containing polymer. A polymer which does not affect the optical characteristics is convenient to be used, whereas another polymer which affects the optical characteristics can be actively used as a material for controlling the optical characteristics. Japanese Laid-Open Patent Publication No. hei 8-50206 reports that cellulose esters are suitable for controlling the tilt angle of a discotic liquid crystalline compound to obtain desired optical characteristics. Preferable examples of cellulose esters include cellulose acetate, cellulose acetate propionate, hydroxypropyl cellulose, and cellulose acetate butylate. Butyrylation degree of cellulose acetate butylate is preferred to be in a range of 30 to 80%, and acetylation degree is preferred to be in a range of 30 to 80%.

These polymer compounds may be used in a range of 0.1 to 30% by weight, preferably 0.1 to 10% by weight with respect to the total weight of the optically anisotropic layer.

[Photo-Polymerization Initiator]

As a photo-polymerization initiator, a known compound may be used which has sensitivity to light at wavelength between 330 nm to 450 nm and generates a polymerization initiating radical effectively. Specific examples include α-carbonyl compounds described in Japanese Laid-Open Patent Publication (Tokkai) No. 2002-296423 and No. (Hei) 8-27284, and U.S. Pat. Nos. 2,367,661 and 2,367,670, acyloin ethers, α-hydrocarbon-substituted aromatic acyloin compounds, polynuclear quinone compounds, combinations of triarylimidazole dimers and p-aminophenyl ketone, acridine, phenazine compounds, oxadiazole compounds, acylphosphine compounds described in Tsumiyoshi et al, J. Photochem., 30, 63(1985), Tsumiyoshi et al, J. Photochem., 32, 119(1986), or Tsumiyoshi et al, J. Photochem., 32, 63(1986), aromatic ketone compounds described in L. R. Gatechair, et al., J. Radiat. Curing., 10(3), 4(1983), and other photo-polymerization initiators described in the specifications of Japanese Laid-Open Patent Publication (Tokkai) hei Nos. 5-5988, 5-72732, 5-107758, 5-281728, 6-266102, 8-202035, 8-234428, 8-234429, 8-305019, 8-339076, and 9-5993, and Japanese Laid-Open Patent Publication (Tokkai) Nos. 2003-280187, 2004-29296, 2004-258648, and 2005-84092.

Specific examples of the compounds include, but are not limited to, the following compounds.

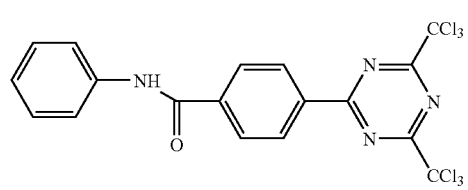

A-1

-continued

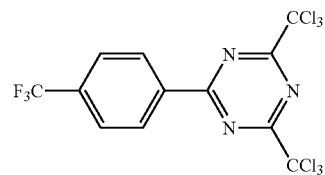

A-2

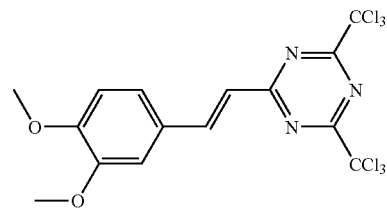

A-3

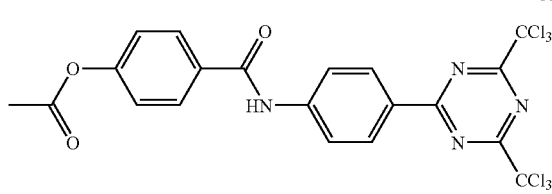

A-4

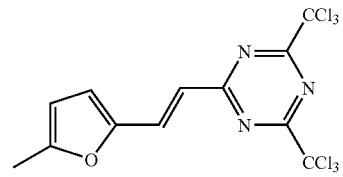

A-5

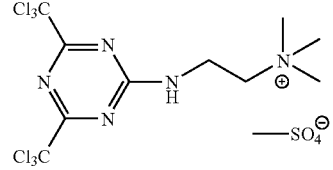

A-6

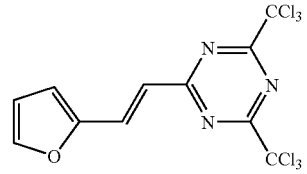

A-7

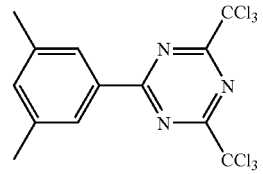

A-8

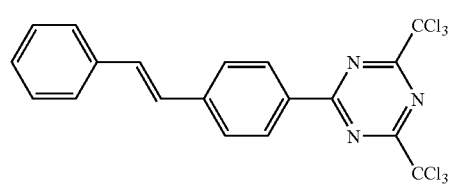 A-9
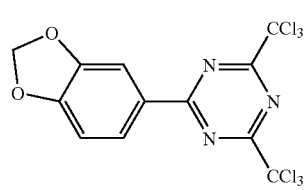 A-10
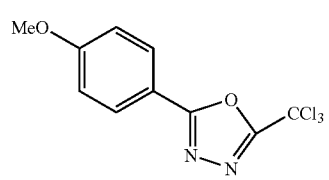 B-1
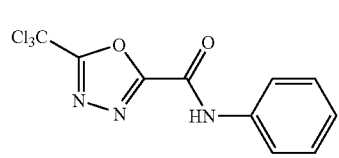 B-2
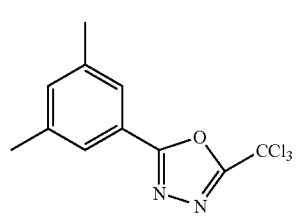 B-3
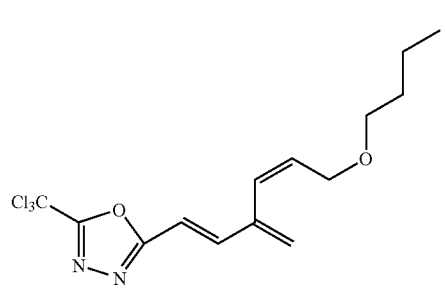 B-4
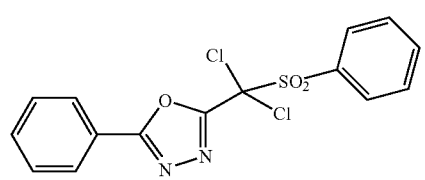 B-5
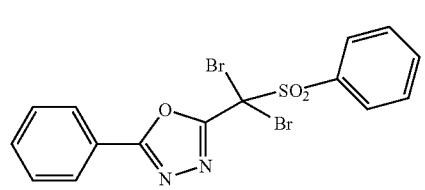 B-6
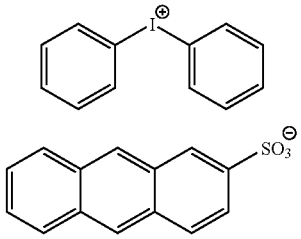 C-1
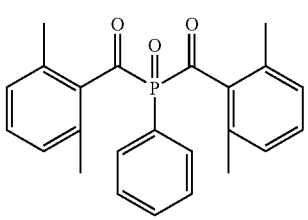 D-1
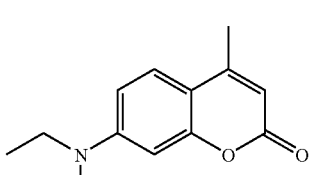 E-1
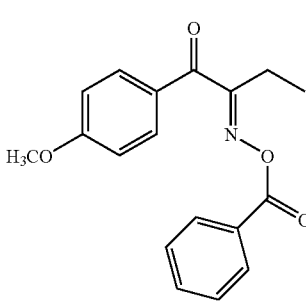 F-1
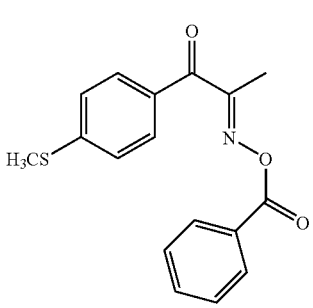 F-2
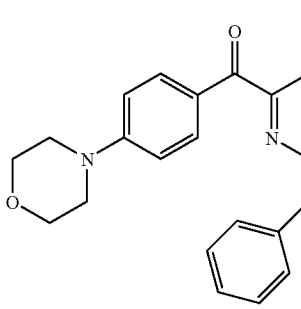 F-3

-continued

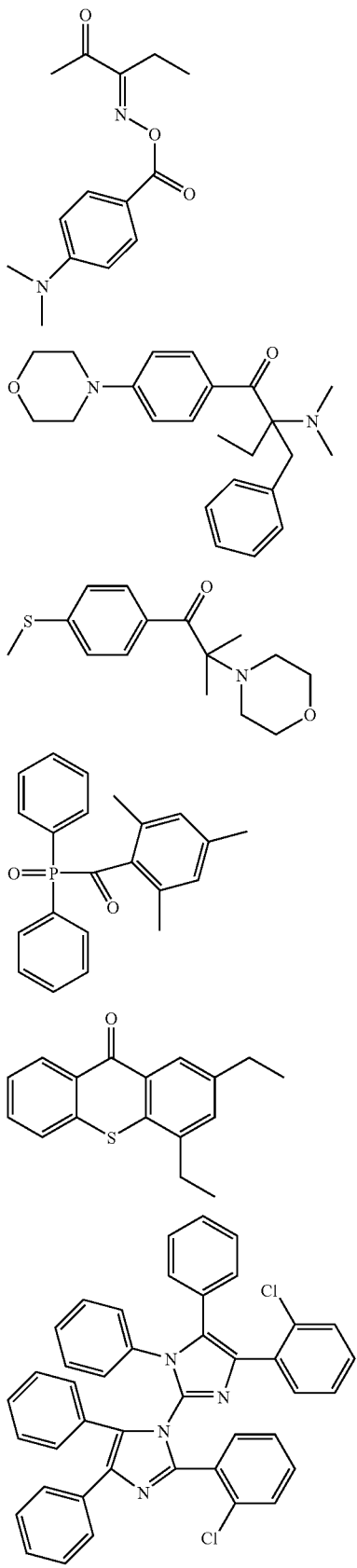

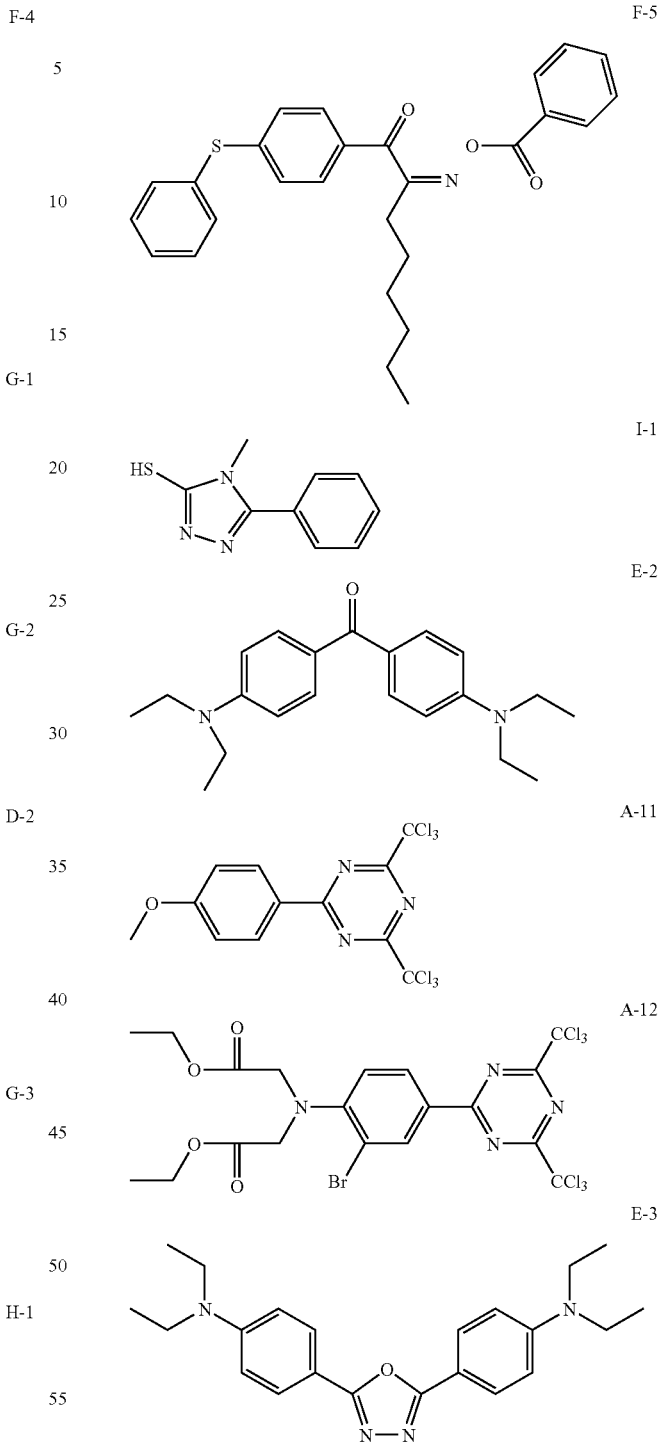

A photo-polymerization initiator may be used singly or two or more photo-polymerization initiator may be used in combination. However, a photo-polymerization initiator is preferred to be used singly.

The total amount of the photo-polymerization initiators is preferably 0.01 to 20% by weight, more preferably 0.5 to 5% by weight with respect to the total weight of the optically anisotropic layer.

[Other Additives]

In addition to the above-mentioned components, a plasticizer, a polymerizable monomer, a chiral agent or the like can be added to the composition for forming the optically anisotropic layer, depending on the needs, for example for controlling the optical characteristics, obtaining the plasticity of the coat, or assisting the polymerization/hardening reaction. Among these, a polymerizable monomer is relatively common additive to be used. A polymerizable monomer is a compound which has vinyl group, vinyloxy group, acryloyl group, methacryloyl group, aryl group or the like. The content of the compound with respect to the discotic liquid crystalline compound is preferably 1 to 50% by weight, and more preferably 5 to 30% by weight.

[Preparation of the Optically Anisotropic Layer]

The optically anisotropic layer can be formed by applying a liquid crystalline composition comprising the above mentioned components to an alignment layer described below, conducting alignment at the transition temperature from liquid crystalline phase to solid phase or a lower temperature, and then fixing the liquid crystalline compounds by UV irradiation. The coating with the liquid crystalline composition can be carried out by a known method (a wire-bar coating method, an extrusion coating method, a direct gravure coating method, a reverse gravure coating method or a die coating method).

The process of the present invention is characterized in that liquid crystalline compounds are aligned at a drying temperature which satisfies the following formula (1). At the drying temperature which satisfies the following formula (1), the vaporization of photo-polymerization initiator is substantially reduced.

$$T \leq 0.0014 \times Ecoh - 65 \quad (1)$$

wherein T represents drying temperature (° C.), Ecoh represents condensation energy (J/mol) of the photo-polymerization initiator which is used. When two or more types of photo-polymerization initiators are used, the condensation energy of the photo-polymerization initiator which has lowest condensation energy among them is used as Ecoh.

The condensation energy of the photo-polymerization initiator means calorie needed for a change of 1 mole of initiator molecules from liquid to gas, and unambiguously calculated from the chemical structure of a photo-polymerization initiator. A specific calculation method is described in "Solubility Parameter Values" on pages 675 to 714 of POLYMER HANDBOOK, JOHN WILEY & SONS, Inc. published in 1997, Chapter 7, Section 7, the disclosure of which is incorporated by reference herein in its entirety.

The condensation energy is generally used as a quantitative index of vaporized amount. As a result of the study of the inventors of the present invention, the condensation energy of photo-polymerization initiator was found to have close correlation with vaporizing temperature of the photo-polymerization initiator.

When the drying temperature is set at a value which satisfies the following temperature (2) to align the liquid crystalline compounds, the photo-polymerization initiator vaporizes easily, to cause insufficient polymerization and severe staining of production facility. The larger the difference between the drying temperature T and (0.0014×Ecoh−65), more severe the insufficiency of the polymerization and the staining of the facility becomes.

$$T > 0.0014 \times Ecoh - 65 \quad (2)$$

From the viewpoint of drying efficiency, the above drying temperature T may be preferably 70° C. or higher, more preferably 90° C. or higher.

As is understood from the formula (1), by using a photo-polymerization initiator which has large condensation energy (for example, 200000 J/mol or higher), a more preferable drying temperature for an alignment of liquid crystalline compounds can be selected.

As the polymerization reaction for fixation of liquid crystalline compounds, a photo-polymerization reaction is conducted. Light irradiation for polymerizing the liquid-crystalline molecules preferably uses ultra violet rays. The irradiation energy is preferably 20 to 5000 mJ/cm$^2$ and more preferably 100 to 800 mJ/cm$^2$. Irradiation may be carried out under heating to accelerate the photo-polymerization reaction. The transition temperature of liquid crystal phase-solid phase is preferably 70 to 300° C., and more preferably 70 to 170° C.

[Alignment Layer]

An alignment layer can be prepared by means of the rubbing treatment of an organic compound (preferably a polymer), the oblique evaporation of an inorganic compound, formation of a layer having microgrooves, or accumulation of organic compounds (e.g., ω-tricosanic acid, dioctadecylmethylammonium chloride and methyl stearate) by Langmuir-Blodgett method (LB film). The alignment layer in the optical compensation sheet produced by the method of the present invention is preferably formed of organic compounds having polymerizable groups. Further, an alignment layer that exhibits an alignment function by a given electric field, a given magnetic field or light irradiation, is also known. Types of the polymer used for the alignment layer can be determined depending on the types of liquid crystal cell display mode. For display modes such as VA, OCB, and HAN, wherein most of rod-shaped liquid crystalline molecules in a liquid crystal cell are substantially vertically aligned (the director is parallel to the normal direction of the transparent support), an alignment layer which has function to align liquid crystalline molecules in the optically anisotropic layer substantially horizontal (when discotic liquid crystalline molecules are used, the director is parallel to the normal direction of the transparent support) may be used. For display modes such as STN, wherein most of rod-shaped liquid crystalline molecules in a liquid crystal cell are substantially horizontally aligned, an alignment layer which has function to align liquid crystalline molecules in the optically anisotropic layer substantially vertical may be used. For display modes such as TN, wherein most of rod-shaped liquid crystalline molecules in a liquid crystal cell are substantially obliquely aligned, an alignment layer which has function to align liquid crystalline molecules in the optically anisotropic layer substantially oblique may be used.

For determining types of specific organic compounds used for the alignment layer in the optical compensation sheet produced by the method of the present invention, publications about an optical compensation sheet using liquid crystalline molecules suitable for the display mode of a liquid crystal cell can be referred to. By introducing cross-linking groups to an organic compound used for the alignment layer, and allowing the cross-linking groups to react, film strength and adherence between layers can be improved. Japanese Laid-Open Patent Publication (Tokkai) hei No. 8-338913 discloses polymerization of an organic compound used for the alignment layer. The thickness of the alignment layer is preferably 0.01 to 5 μm, more preferably 0.05 to 2 μm. Examples of the above organic compound used for the alignment layer include polymers such as poly methyl methacrylate, acrylic acid/methacrylic acid copolymer, styrene/maleimide copolymer, polyvinyl alcohol, modified polyvinyl alcohol, poly(N-methyrol acrylamide), styrene/vinyl toluene copolymer, chlorosulfonated polystyrene, nitro cellulose, polyvinylchloride, chlorinated polyolefin, polyester, polyimide, vinyl acetate/vinylchloride copolymer, ethylene/vinyl acetate copolymer, carboxymethyl cellulose, polyethylene, polypropylene, and polycarbonate; and compounds such as silane coupling agent.

Examples of preferable polymer as the organic compound used for the alignment layer include water-soluble polymers such as poly(N-methyrol acrylamide), carboxy methyl cellulose, gelatin, polyvinyl alcohol and modified polyvinyl alcohol. Among these, gelatin, polyvinyl alcohol and modified polyvinyl alcohol are preferred; and polyvinyl alcohol and modified polyvinyl alcohol are more preferred.

As the polyvinyl alcohol, polyvinyl alcohols having a saponification degree of 70 to 100% can be used, those having a saponification degree of 80 to 100% are preferably used, and those having a saponification degree of 85 to 95% are more preferably used. The polymerization degree of polyvinyl alcohol is preferably from 100 to 3000. Examples of modified polyvinyl alcohol include polyvinyl alcohols modified by copolymerization such as polyvinyl alcohols having COONa, $Si(OX)_3$, $N(CH_3)_3.Cl$, $C_9H_{19}COO$, $SO_3Na$, $C_{12}H_{25}$ or the like as a modified group; polyvinyl alcohols modified by chain transfer reaction such as polyvinyl alcohols having COONa, SH, $SC_{12}H_{25}$ or the like as a modified group; and polyvinyl alcohols modified by block polymerization such as polyvinyl alcohols having COOH, $CONH_2$, COOR, $C_6H_5$ or the like as a modified group. The polymerization degree of the modified polyvinyl alcohol is preferably from 100 to 3000.

Among these, modified or non-modified polyvinyl alcohols having a saponification degree of 80 to 100% are preferred, and non-modified polyvinyl alcohols having a saponification degree of 85 to 95% or alkylthio-modified polyvinyl alcohols having a saponification degree of 85 to 95% are more preferred.

[Transparent Support]

As the transparent support of the optical compensation sheet, a polymer film having a controlled optical anisotropy is preferably used. "Transparency" with respect to a support means that the support has light transmission of 80% or more.

As materials for the transparent support, cellulose esters, polycarbonates, polysulfones, polyeter sulfones, polyacrylates, polymethacrylates, or norbornene resins can be used. By stretching the polymer film, a desired optical anisotropy can be obtained. Additionally, a retardation-increasing agent (described in the specification of European Patent 0 911 656 A2) can be added to a cellulose ester film to obtain a cellulose ester film with high optical anisotropy. As a transparent support in the optical compensation sheet of the present invention, a cellulose acylate film is particularly preferred.

A cellulose ester film and a synthesized polymer film are preferably formed by a solution casting method. The thickness of a transparent support is preferably 20 to 500 μm, and more preferably 50 to 200 μm. In order to improve adhesiveness between the support and a layer provided thereon (an adhesive layer, an alignment layer or an optically anisotropic layer), the surface treatment (e.g., a glow discharge treatment, a corona discharge treatment, an ultraviolet (UV) radiation treatment, a flame treatment, a saponification treatment) may be performed on the support. On the support, an adhesive layer (an undercoat layer) may be provided.

[Protective Film]

A protective film may be provided on the optically anisotropic layer. A protective film is provided for the purpose of protecting the surface of the optically anisotropic layer, improving smoothness of the surface, and the like. Compounds used for the protective film are not particularly limited, and preferred to be polymer compounds which are soluble to a solvent which does not dissolve the optically anisotropic layer, and have film-forming ability. Specific examples include gelatin, methyl cellulose, alginic acid, pectine gum arabic, pullulan, polyvinyl alcohol, polyvinyl pyrrolidone, polyacrylic amide, polyvinyl benzenesulfonate sodium salt, carrageenan, and polyethyleneglycol.

[Liquid Crystal Display Device]

The optical compensation sheet produced by the method of the present invention can be used in liquid crystal display devices of various display mode such as TN (Twisted Nematic), IPS (In-Plane Switching), FLC (Ferro Electric Liquid Crystal), OCB (Optically Compensatory Bend), STN (Super Twisted Nematic), VA (Vertically Aligned), and HAN (Hybrid Aligned Nematic). A liquid crystal display device comprises a liquid crystal cell and a polarizing plate. The polarizing plate comprises protective film, a polarizing film, and the optical compensation sheet (retardation plate). As the polarizing film, examples include an iodine-based polarizing film, a dye-based polarizing film which uses a dichromatic dye, and a polyene-based polarizing film. In general, polyvinyl alcohol-based films are used to produce iodine-based polarizing films and dye-based polarizing films. The polarizing axis of the polarizing film corresponds to the vertical direction of the stretching direction of the film. A protective film may be provided on each side of the polarizing film, and the transparent support in the optical compensation sheet may function as one of the protective films. The other of the protective films is preferred to be a cellulose ester film which has high optical isotropy.

EXAMPLES

Hereinafter, the present invention will be further described in detail with reference to Examples and Comparative Examples. Materials, contents, ratios, processing contents, processing order and the like as presented below may be suitably modified as long as the object of the invention is not impaired. The scope of the invention is not limited to these specific examples below.

Comparative Example 1

Preparation of a Transparent Support

The following composition was charged in a mixing tank and stirred under heating, to dissolve the individual ingredients to prepare a cellulose acetate solution.

| <Composition of cellulose acetate solution (part by weight)> | |
| --- | --- |
| Cellulose acetate with an acetylation degree of 60.9% | 100 |
| Triphenyl phosphate (plasticizer) | 7.8 |
| Biphenyldiphenyl phosphate (plasticizer) | 3.9 |
| Methylene chloride (first solvent) | 300 |
| Methanol (second solvent) | 45 |
| Colorant (SUMIKA FineChem 360FP) | 0.0009 |

The retardation increasing agent shown below (16 parts by weight), methylene chloride (80 parts by weight), and methanol (20 parts by weight) were charged in another mixing tank and stirred under heating to obtain a retardation increasing agent solution.

The cellulose acetate solution (464 parts by weight) of the above composition was mixed with the retardation increasing agent solution (36 parts by weight), silicon dioxide particles (AEROSIL R972, 1.1 parts by weight). The mixture was sufficiently stirred to prepare a dope. The amount of the added retardation increasing agent was 5.0 parts by weight per 100 parts by weight of cellulose acetate, and the amount of the added silicon dioxide particles was 0.15 parts by weight per 100 parts by weight of cellulose acetate.

Retardation Increasing Agent

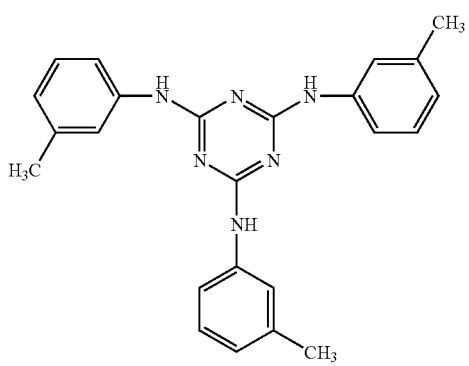

The dope thus obtained was cast by band casting apparatus. Upon the film surface temperature on band being 40° C., the film was dried for 1 minute, and peeled off from the band. Then, the film was dried with drying air to obtain the cellulose acetate film (CA-1) with 0.3 weight % of residual solvent amount (thickness: 109 μm).

The retardation at the wavelength 550 nm of the prepared cellulose acetate film was measured to obtain Rth retardation value of 85 nm and Re retardation value of 7 nm.

(Saponification Treatment and Alignment Film Formation)

Dielectric heating roll at 60° C. was passed on the cellulose acetate film (CA-1). After the surface temperature of the film was reached to 40° C., an alkaline solution having the following composition (S-1) was applied on the surface by using a rod coater at an amount of 15 ml/m². The coated film was retained for 15 seconds under a steam-type far-infrared heater manufactured by Noritake Company Limited which was heated up to 110° C., then purified water was applied to the film by using a rod coater at an amount of 3 ml/m². The film temperature at this moment was 40° C. Subsequently, after cleaning with water by using a fountain coater and draining of the water by using air knife were repeated three times, the film was retained in a drying zone at 70° C. for 5 seconds to be dried.

| <Composition of alkaline solution (S-1) (part by weight)> | |
|---|---|
| Potassium hydroxide | 8.55 |
| Water | 23.235 |
| sopropanol | 54.20 |
| Surfactant (K-1: $C_{14}H_{29}O(CH_2CH_2O)_{20}H$) | 1.0 |
| Propyleneglycol | 13.0 |
| Defoaming agent Surfynol DF110D (Nissin Chemical Industry Co., Ltd.) | 0.015 |

To the surface treated film, a coating liquid for forming an alignment film of the following composition was applied by a load coater with an amount of 28 mL/m², and dried for 60 seconds with warm air at 60° C. and for 150 seconds with warm air at 90° C.

| <Composition of a coating liquid for forming an alignment film (part by weight)> | |
|---|---|
| Denatured polyvinyl alcohol shown below | 20 |
| Water | 360 |
| Methanol | 120 |
| Glutaraldehyde | 0.5 |

Denatured Polyvinyl Alcohol

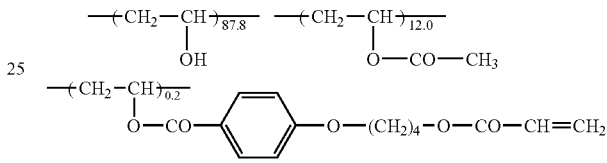

Then a rubbing treatment was conducted in the longitudinal direction of the surface of the formed alignment film.

(Preparation of Optically Anisotropic Layer)

To a surface of the alignment film, the coating solution having the following composition containing a discotic liquid crystalline compound (DAH-1: concentration of the solid part 32.6%; MEK solvent) was applied by using a #3.2 wire bar coater. It was then heated for 3 minutes in a thermostat zone at 130° C. to align the discotic liquid crystalline molecules. The amount of the vaporized photo-polymerization initiator was calculated from the optical concentration of absorption spectrum of the obtained film before the fixation. The vaporized amount was determined by a comparison with the optical concentration of absorption spectrum of a film obtained by drying at 40° C. which was set at 100%.

Separately, after the above heating for 3 minutes, the film was then subjected to a UV irradiation at 300 mJ/cm², with a high-pressure mercury lamp, and left to cool down to room temperature to obtain an optical compensation sheet (KSH-1).

| <Composition of coating solution containing a discotic liquid crystalline compound (DAH-1) (part by weight)> | |
|---|---|
| Discotic liquid crystalline compound DLC-A shown below | 9.1 |
| Ethylene oxide-modified trimethylolpropane triacrylate (V#360, manufactured by Osaka organic chemistry Co., Ltd.) | 0.9 |
| Cellulose acetate butyrate (CAB551-0.2, manufactured by Eastman Chemical Ltd.) | 0.2 |
| Cellulose acetate butyrate (CAB531-1, manufactured by Eastman Chemical Ltd.) | 0.05 |
| IRGACURE 907 (the aforementioned compound G-2) | 0.3 |
| KAYACURE DETX (manufactured by Nippon Kayaku Co., Ltd.) (the aforementioned compound G-3) | 0.1 |

-continued

| <Composition of coating solution containing a discotic liquid crystalline compound (DAH-1) (part by weight)> | |
|---|---|
| fluorine-containing surfactant Megafac 1176 (from Dainippon Ink and Chemicals, Inc.) | 0.02 |
| Methylethylketone | 21.95 |

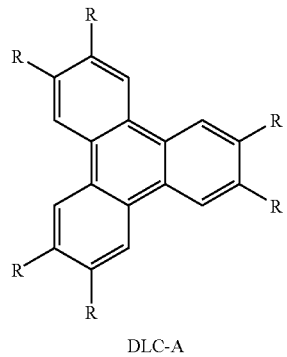

DLC-A

R: 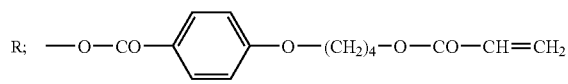

Example 1 to 6

Preparation of Transparent Support

The cellulose acetate film (CA-1) was prepared in the same manner as that in Comparative Example 1.

(Saponification Treatment and Alignment Film Formation)

The cellulose acetate film (CA-1) was subjected to the saponification treatment, the alignment film formation, and the rubbing treatment in the same manner as that in Comparative Example 1.

(Preparation of Optically Anisotropic Layer)

Coating solutions containing a discotic liquid crystalline compound (DA-1 to DA-6) were prepared in a similar manner to that of Comparative example 1 except the compounds described in Table 1 instead of IRGACURE 907 and KAYA-CURE DETX were used as photo-polymerization initiators in the composition of the coating solution containing a discotic liquid crystalline compound (DAH-1). Each of the compounds was used at the amount described in Table 1. The coating solutions were applied and dried in a similar manner to that of Comparative example 1 to obtain optical compensation sheets (KS-1 to KS-6).

Example 7 to 10

Comparative Example 2 to 4

Preparation of a Transparent Support

The following composition was charged in a mixing tank and stirred under heating, to dissolve the individual ingredients to prepare a cellulose acetate solution.

| <Composition of cellulose acetate solution (part by weight)> | |
|---|---|
| Cellulose acetate with an acetylation degree of 60.9% | 100 |
| Triphenyl phosphate (plasticizer) | 7.8 |
| Biphenyldiphenyl phosphate (plasticizer) | 3.9 |
| Methylene chloride (first solvent) | 300 |
| Methanol (second solvent) | 45 |
| Colorant (SUMIKA FineChem 360FP) | 0.0009 |

The above retardation increasing agent (16 parts by weight), methylene chloride (80 parts by weight), and methanol (20 parts by weight) were charged in another mixing tank and stirred under heating to obtain a retardation increasing agent solution.

The cellulose acetate solution (464 parts by weight) of the above composition was mixed with the retardation increasing agent solution (36 parts by weight), silicon dioxide particles (AEROSIL R972, 1.1 parts by weight). The mixture was sufficiently stirred to prepare a dope. The amount of the added retardation increasing agent was 5.0 parts by weight per 100 parts by weight of cellulose acetate, and the amount of the added silicon dioxide particles was 0.15 parts by weight per 100 parts by weight of cellulose acetate.

The dope thus obtained was cast by band casting apparatus. Upon the film surface temperature on band being 40° C., the film was dried for 1 minute, and peeled off from band. Then, the film was stretched in drying air in the width direction to obtain the cellulose acetate film (CA-2) with 0.3 weight % of residual solvent amount (thickness: 88 μm).

The retardation at the wavelength 550 nm of the prepared cellulose acetate film was measured to obtain Rth retardation value of 175 nm and Re retardation value of 36 nm.

(Saponification Treatment and Alignment Film Formation)

The same treatment was conducted as that in the Comparative example 1.

(Preparation of Optically Anisotropic Layer)

To a surface of the alignment film, the coating solution having the following composition containing a discotic liquid crystalline compound (DA-7 to 10, DAH-2: concentration of the solid part 35.5%; MEK solvent) was applied by using a #3.2 wire bar coater. The film was then heated for 3 minutes in a thermostat zone at the temperature shown in Table 1 to align the discotic liquid crystalline molecules. The amount of the vaporized photo-polymerization initiator was calculated from the optical concentration of absorption spectrum of the obtained film before the fixation in the same manner as that in Comparative example 1. Separately, after the above heating for 3 minutes, the film was subjected to a UV irradiation at 500 mJ/cm², with a high-pressure mercury lamp, and left to cool down to room temperature to obtain an optical compensation sheet (KS-7 to 10, KSH-2).

| <Composition of coating solution containing a discotic liquid crystalline compound (DA-7 to 10, DAH-2) (part by weight)> | |
|---|---|
| Discotic liquid crystalline compound shown above | 9.1 |
| Ethylene oxide-modified trimethylolpropane triacrylate (V#360, manufactured by Osaka organic chemistry Co., Ltd.) | 0.9 |
| Cellulose acetate butyrate (CAB531-1, manufactured by Eastman Chemical Ltd.) | 0.15 |
| Photo-polymerization initiator shown in Table 1 | 0.3 |
| fluorine-containing surfactant Megafac M-1176 (from Dainippon Ink and Chemicals, Inc.) | 0.02 |
| Methylethylketone | 19.03 |

Example 11 to 13

Comparative Example 5

Preparation of Transparent Support

The cellulose acetate film (CA-2) was prepared in the same manner as that in Comparative Example 2.

(Saponification Treatment and Alignment Film Formation)

The cellulose acetate film (CA-2) was subjected to the saponification treatment and the alignment film formation, in a similar manner to that in Comparative Example 2, except that the film was subjected to no rubbing treatment.

(Preparation of Optically Anisotropic Layer)

To a surface of the alignment film, the coating solution having the following composition containing a rod-like liquid crystalline compound (DA-11 to 13, DAH-3 to 4) was heated for 2 minutes at a temperature shown in Table 1 to align the rod-like liquid crystalline molecules. The amount of the vaporized photo-polymerization initiator was calculated from the optical concentration of absorption spectrum of the obtained film before the fixation in the same manner as that in Comparative example 1. Separately, after the above heating, the film was then subjected to a UV irradiation at 500 mJ/cm$^2$, with a high-pressure mercury lamp, and left to cool down to room temperature to obtain an optical compensation sheet (KS-10 to 12, KSH-5).

| <Composition of coating solution containing a rod-like liquid crystalline compound (DA-11 to 13, DAH-3 to 4) (part by weight)> | |
|---|---|
| Rod-like liquid crystalline compound BLC-A shown below | 9.1 |
| Fluorine containing binder BT-A shown below | 0.5 |
| Orientation promoting agent HA-A shown below | 1.0 |
| IRGACURE 907 | 0.3 |
| KAYACURE DETX (manufactured by Nipponn Kayaku Co., Ltd.) | 0.1 |

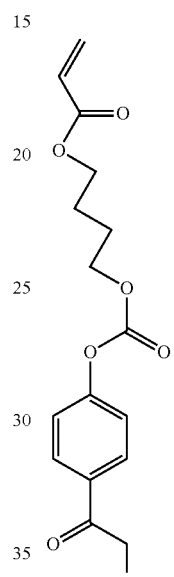

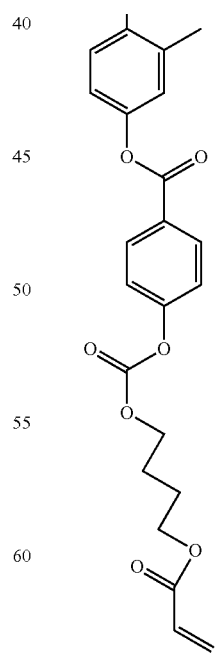

BLC-A

<Composition of coating solution containing a rod-like liquid crystalline compound (DA-11 to 13, DAH-3 to 4) (part by weight)>

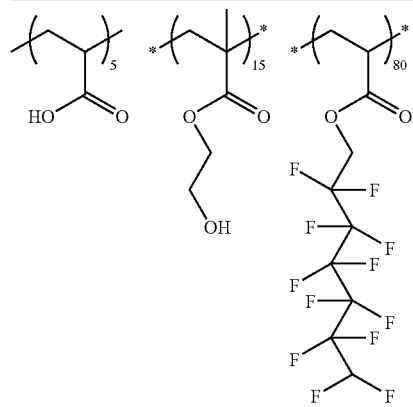

BT-A

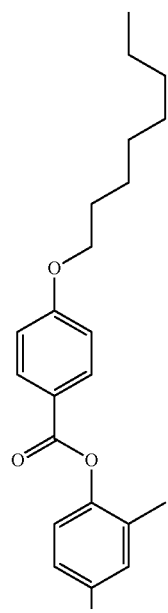

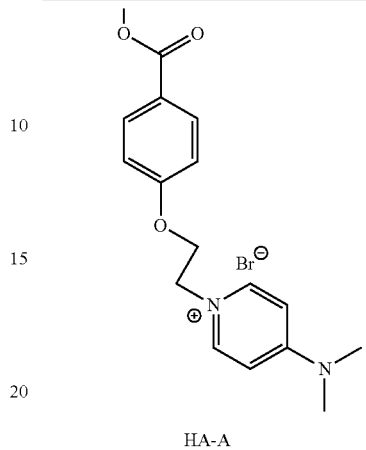

HA-A (Delamination Evaluation of Optical Compensation Films)

Each of the optical compensation films obtained in Example 1 to 14 and Comparative example 1 to 5 was evaluated for properties of alignment of liquid crystalline and delamination. The alignment property was evaluated by visual observation via a polarizing film. The delamination (adhesion) was evaluated by using a test piece according to the cross-cut adhesion tape method JIS K 5400.8.5.2., wherein an adhesive tape N031RH made of polyester manufactured by Nitto Denko was used for the evaluation. When the effect of the photo-polymerization is insufficient, the film is susceptible to be delaminated. The results are shown in Table 1 wherein the delamination properties are indicated in residual ratio. The 100% indicates no delamination, 0% indicates delaimination in full area.

When examples 1 to 13 and comparative examples 1 to 5 are compared, it is clearly understood that the film produced by using the process of the present invention shows less photo-polymerization initiator vaporization, and has superior optical characteristics and adhesion.

TABLE 1

| Coating Solution No. | Photopolymerization Initiator | EcohJ/mol of Photopolymerization Initiator | 0.0014 × Ecoh−65 | Drying Temperature °C. | Vaporized Amount % | Film Number | Alignment | Adhesion test Residual ratio % |
|---|---|---|---|---|---|---|---|---|
| Example |  |  |  |  |  |  |  |  |
| 1 | DA-1 | D-1 | 158820 | 157 | 130 | 2 | KS-1 | Good | 100 |
| 2 | DA-2 | F-5 | 190780 | 202 | 130 | 3 | KS-2 | Good | 100 |
| 3 | DA-3 | A-12 | 210962 | 230 | 130 | 0 | KS-3 | Good | 100 |
| 4 | DA-4 | A-10 | 141890 | 133 | 130 | 5 | KS-4 | Good | 100 |
| 5 | DA-5 | A-3 | 153940 | 151 | 130 | 2 | KS-5 | Good | 100 |
| 6 | DA-6 | A-1 | 186830 | 197 | 130 | 0 | KS-6 | Good | 100 |
| 7 | DA-7 | H-1 | 269900 | 312 | 130 | 0 | KS-7 | Good | 95 |
|   |      | E-3 | 147320 | 141 |     | 3 |      | Good |    |
| 8 | DA-8 | G-1 | 138220 | 129 | 120 | 0 | KS-8 | Good | 100 |
| 9 | DA-9 | A-11 | 137260 | 126 | 120 | 1 | KS-9 | Good | 100 |
| 10 | DA-10 | A-10 | 141890 | 133 | 120 | 1 | KS-10 | Good | 100 |
| 11 | DA-11 | A-10 | 141890 | 133 | 80 | 2 | KS-11 | Good | 100 |

TABLE 1-continued

| Coating Solution No. | Photopolymerization Initiator | EcohJ/mol of Photopolymerization Initiator | 0.0014 × Ecoh−65 | Drying Temperature °C. | Vaporized Amount % | Film Number | Alignment | Adhesion test Residual ratio % |
|---|---|---|---|---|---|---|---|---|
| 12 | DA-12 | G-2 | 106360 | 64 | 70 | 4 | KS-12 | Good | 100 |
| 13 | DA-13 | G-3 | 115750 | 97 | 70 | 2 | KS-13 | Good | 100 |
| Comparative Example | | | | | | | | | |
| 1 | DAH-1 | G-2 | 106360 | 84 | 130 | 59 | KSH-1 | Poor | 5 |
|  |  | G-3 | 115750 | 97 |  | 32 |  |  |  |
| 2 | DAH-2 | G-1 | 138220 | 129 | 130 | 29 | KSH-2 | Good | 15 |
| 3 | DA-9 | A-11 | 137260 | 128 | 130 | 22 | KSH-3 | Poor | 5 |
| 4 | DAH-3 | H-1 | 269900 | 312 | 120 | 0 | KSH-4 | Poor | 0 |
|  |  | E-2 | 128230 | 114 |  | 17 |  |  |  |
| 5 | DAH-4 | G-2 | 106360 | 84 | 100 | 23 | KSH-5 | Poor | 0 |

INDUSTRIAL APPLICABILITY

In the process of producing an optical compensation sheet of the present invention, vaporization of photo-polymerization initiator can be prevented during the drying step in the preparation of an optically anisotropic layer. Therefore, the subsequent polymerization and fixation can be carried out efficiently with the minimum amount of photo-polymerization initiator needed for polymerization. By the process of the present invention, an optical compensation sheet with stable optical characteristics can be produced. Further, the process of the present invention causes less staining of production facility by preventing vaporization of photo-polymerization initiator.

CROSS-REFERENCE TO RELATED APPLICATIONS

This application claims benefit of a priority under 35 USC 119 to Japanese Patent Application No. 2006-078941 filed on Mar. 22, 2006, the disclosure of which is incorporated by reference herein in its entirety.

The invention claimed is:

1. A process of producing an optical compensation sheet, which comprises applying a solution comprising a liquid crystalline compound and a photo-polymerization initiator on a transparent support, drying the solution at a drying temperature which satisfies the following formula (1) to align the liquid crystalline compound, and then fixing the liquid crystalline compound by light irradiation to form an optical anisotropic layer:

$$T \leq 0.0014 \times Ecoh - 65 \quad (1)$$

wherein T represents drying temperature (° C.), and Ecoh represents condensation energy (J/mol) of the photo-polymerization initiator; wherein the transparent support is a cellulose acylate film.

2. The process according to claim 1, wherein the optical compensation sheet further comprises an alignment layer between the transparent support and the optical anisotropic layer.

3. The process according to claim 2, wherein the alignment layer comprises an organic compound having a polymerizable group.

4. A polarizing plate which comprises the optical compensation sheet obtainable from the process according to claim 1.

5. A liquid crystal display device which comprises the polarizing plate according to claim 4.

* * * * *